United States Patent [19]

Allen

[11] Patent Number: 4,589,446
[45] Date of Patent: May 20, 1986

[54] PIPE REPAIR BYPASS APPARATUS

[76] Inventor: Gordon L. Allen, 12994 Cherry La., Chesterland, Ohio 44026

[21] Appl. No.: 729,982

[22] Filed: May 2, 1985

[51] Int. Cl.$^4$ ............................................. F16L 55/16
[52] U.S. Cl. ....................................................... 138/97
[58] Field of Search .......................... 138/89, 97, 109;
219/59.1, 61, 85 M; 29/157.1 R; 137/15;
228/119

[56] References Cited

U.S. PATENT DOCUMENTS

| | | | |
|---|---|---|---|
| 2,620,830 | 12/1952 | Schultz | 138/97 |
| 3,962,767 | 6/1976 | Byerley et al. | 138/97 |
| 4,357,960 | 11/1982 | Han | 138/97 |
| 4,508,129 | 4/1985 | Brown | 137/15 |

FOREIGN PATENT DOCUMENTS 1128232 4/1962 Fed. Rep. of Germany ........ 138/97

Primary Examiner—Stephen Marcus
Assistant Examiner—Leo J. Peters
Attorney, Agent, or Firm—Paul Bogdon

[57] ABSTRACT

A pipe repair bypass apparatus which enables residual water in pipes to flow without touching the area of the pipe to be repaired by soldering, is disclosed. The bypass apparatus includes a flexible disc slightly greater in its outer diameter than the inner diameter of the pipe to be repaired. The disc has a central opening which receives one end of elongated flexible tubing. A rigid tube is slideably arranged on the flexible tubing and serves to aid in inserting the disc and flexible tubing into the pipe to be repaired. When the apparatus is disposed inside a pipe, the disc acts as a dam for any water in the pipe with the water eventually flowing through the flexible tubing thereby avoiding the repair area.

2 Claims, 4 Drawing Figures

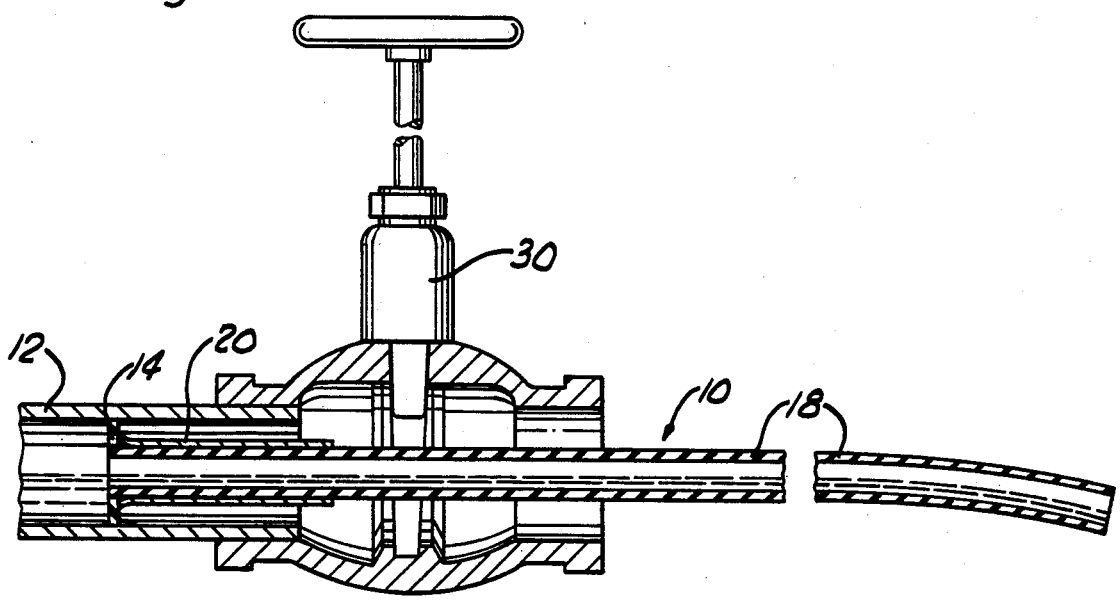
Fig.1
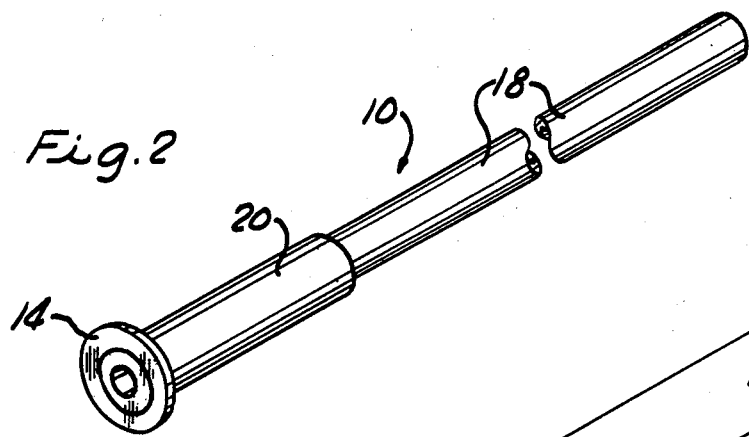
Fig.2
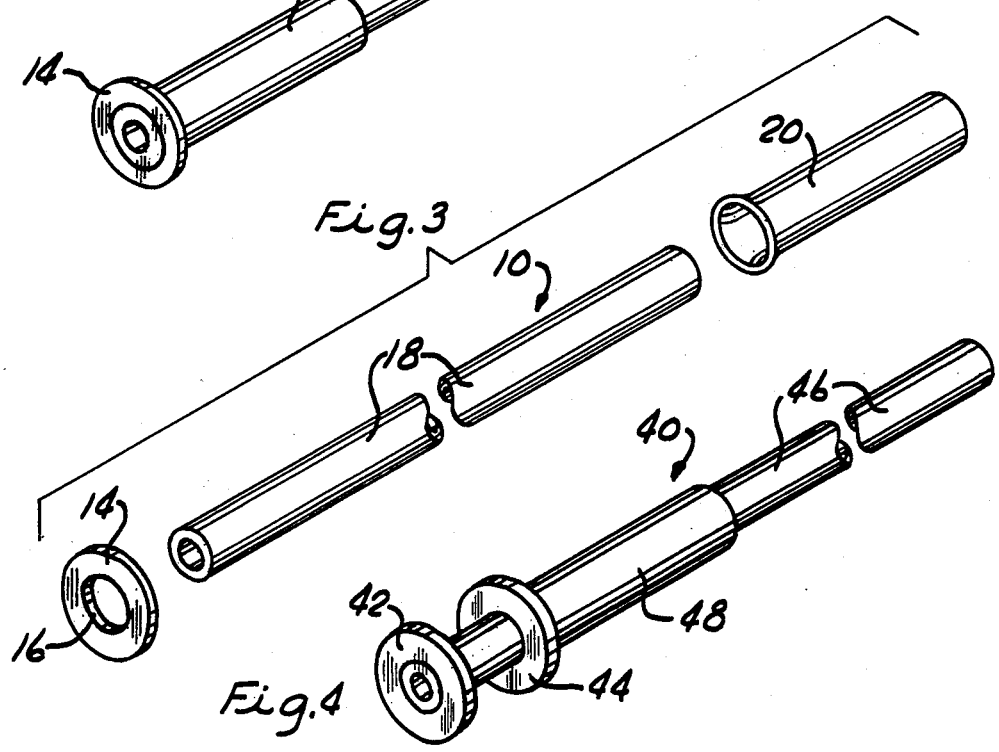
Fig.3
Fig.4

PIPE REPAIR BYPASS APPARATUS

BACKGROUND OF THE INVENTION

To properly solder or braze a pipe joint in any plumbing system, the pipes must be free of any liquid. Should any liquid, such as water, be flowing in the pipe, even if the quantity flowing were very small, the solder will not properly bond and an inferior joint will be produced during a repair operation. In large plumbing systems such as would be found in industrial, commercial or institutional settings, it is difficult to eliminate all the water in the piping for several reasons. One reason is that the shut-off valve may be at a great distance from the place of repair, and even after the valve is closed, water will trickle through the pipe for a long period of time. Another reason why water remains flowing in the pipes is that the shut-off valve may be below the level of the repair place and in order to make the repair, the water would have to be drained from the pipe prior to soldering. A great deal of time might be required before the pipe would be completely drained. Where the point of repair is below the drain level, the pipe would have to be cut to allow the pipe to be drained. Yet another reason why water remains trickling through pipes is that shut-off valves oftentimes do not completely block the flow of water and small quantities of water leak pass the valve.

Various devices have been made to plug pipes to stop the flow of liquid through a pipe during repair. The known devices have had various disadvantages. They all are somewhat complex in structure requiring multiple elements interacting to expand a plug to stop the water flow. These known plugging devices are expensive to manufacture and purchase. In large plumbing systems various diameter pipes are used and would require a plugging device for each diameter pipe, at a great expense to the user. Another disadvantage of the known plugging devices is that they are rigid in their makeup. The devices are provided with stiff shafts that are rotated for expanding the plugs. The rigid construction of the plugging devices prevents their use through elbows or other blends in a piping system. In other words, the known plugging devices are limited to use in straight sections of pipe. Where a bend exists in the piping system, the pipe would have to be cut to provide a straight section to accomodate the plugging devices.

My invention provides a pipe repair bypass apparatus for use in repairing pipes by brazing, welding or soldering, hereinafter collectively referred to as soldering, which apparatus is very simple in construction, inexpensive to manufacture, and capable of being used in piping systems having bends or elbows without having to cut the pipe to take the bend out of the repair zone. My invention has few elements, none of which are required to be rotated through sophisticated connections or the like to expand plugs. My bypass apparatus is also simple to use requiring easy insertion and removal into and out of the pipe to be repaired. In addition to the just mentioned advantages, my invention is readily adaptable to different diameter pipes simply by changing the size of one element to conform to a particular size pipe. The cost difference between the various sizes of my invention would be very small.

SUMMARY OF THE INVENTION

The pipe repair bypass apparatus of my invention, in its preferred form, comprises: a flexible stop means having outer dimensions slightly larger than the inside dimensions of pipe to be repaired for insertion into pipe to partially block the flow of liquid through the pipe, the stop means having an opening therethrough; elongated flexible tubing having one end thereof secured to the stop means and extending through the opening of the stop means with the passageway of the tubing being unobstructed to allow flow of liquid across the stop means; and rigid insertion means surrounding the tubing at one end section thereof and abutting the stop means for inserting the stop means and the tubing into the confines of pipe to be repaired. My stop means is preferably a disc formed from any suitable rubber or rubber-like material. My tubing is preferably any suitable rubber type tubing and is fixed in a central opening through the disc. The insertion means may be a section of metal tubing slideably arranged on the tubing. Thus, my invention has three simple elements which may be produced inexpensively with the assembly of the elements to form my invention being uncomplicated. To accomodate different sized pipes would require the disc to be sized to snugly fit within those pipes.

Various other advantages, details and modifications of the present invention will become apparent as the following descriptions of present preferred embodiments proceed.

DESCRIPTION OF THE DRAWINGS

In the accompanying drawings I show certain preferred embodiments of this invention, in which:

FIG. 1 is a longitudinal sectional view through sections of pipe and a gate valve showing the pipe repair bypass apparatus of this present invention in position to bypass liquid through the pipe and valve to avoid contact of the liquid with the joint to be soldered;

FIG. 2 is a perspective view of the pipe repair bypass apparatus of this present invention;

FIG. 3 is a perspective view of the pipe repair bypass appartus of FIGS. 1 and 2 showing the elements separated and unconnected; and FIG. 4 is a perspective view of another embodiment of the pipe repair bypass apparatus of this present invention.

DESCRIPTION OF A PREFERRED EMBODIMENT

Referring now to the drawings, there is illustrated a pipe repair bypass apparatus 10 of the present invention, shown in FIG. 1 in position in pipe 12 such as a copper pipe of the type found in a hot water heating system in a commercial or institutional building. The pipe repair bypass apparatus 10 includes a disc 14 formed of a suitable flexible material such as neoprene rubber or the like, the disc having a central opening 16 therethrough as clearly shown in FIG. 3. The outer diameter of disc 14 is slightly larger than the inner diameter of pipe 12 so that the disc 14 will provide a tight seal within the pipe to partially dam or block any liquid, such as water, and divert the flow of the water through the rubber tubing 18 which is secured to the disc 14 in opening 16.

The bypass apparatus 10 is inserted into pipe 12 with the aid of a rigid insertion tube 20 which is slideably arranged on tubing 18. The insertion tube 20 is preferably formed of a suitable metal such as copper, and has one end flared to the disc 14 without penetrating it so as to cause damage to the disc.

FIG. 1 shows a gate valve 30 positioned on one end of pipe 12. This valve 30 is ready to be secured to the pipe 12 by soldering. FIG. 1 also shows water in the pipe 12 the water being partially dammed or blocked by the disc 14 and its flow diverted through tubing 18. The water will not touch the joint where the pipe 12 and valve 30 are to be secured by soldering. Thus, the soldered joint between the pipe 12 and valve 30 will be properly bonded and will be a secure joint. Any amount of water flowing across the joint to be soldered will prevent proper bonding of the solder to the pipe 12.

FIG. 4 shows another embodiment of the pipe repair bypass apparatus 40 of my present invention. The bypass apparatus 40 includes a pair of identically shaped and sized discs 42 and 44 both formed of a suitable flexible material. Each disc 42 and 44 is similar in all respects to disc 14 of the embodiment of FIGS. 1-3, with each having a central opening. The discs 42 and 44 are secured in their central opening to a length of rubber tubing 46, with disc 42 being secured at an end section of the tubing with disc 44 being parallel to disc 42 and longitudinally spaced therefrom. By providing the double disc 42 and 44 arrangement, the tubing 46 will have increased support at the inner end section thereof. Also, the double disc 42 and 44 arrangement will provide an increased overall sealing effect in the pipe being repaired. A rigid insertion tube 48 is slideably arranged on tubing 46 in the same manner and for the same purpose as tube 20 of the embodiment of FIGS. 1-3.

One typical application of the use of the pipe repair bypass apparatus 10 or 40 is in repairing a pipe leak at a radiator in a commercial or institutional hot water heating system. The first step would be to shut off the water flowing to the radiator. The input pipe to this radiator would be cut and the bypass apparatus 10 or 40 inserted into the input pipe to divert water flow. A gate valve would then be joined to the end of the cut input pipe and soldered in place. The bypass apparatus 10 or 40 would then be removed and the gate valve closed. The output end of the gate valve would then be soldered to the input pipe of the radiator and the water then allowed to flow into the radiator.

In using my pipe repair bypass apparatus 10 or 40 for repairing pipe leaks, the following procedure may be used. After the flow of water is shut off, the leaking pipe may be cut in the vicinity of the leak and the leaking section removed. My bypass apparatus 10 or 40 would then be inserted into the upstream section of the pipe. One section of a union would then be put on the cut end of the upstream pipe and soldered to the pipe. The other section of this union would be soldered to the downstream section of pipe which would have no water flowing therein, and soldered to the pipe. The union sections would be joined after my bypass apparatus is removed from the upstream section of pipe, and the water turned on.

It should now be clearly understood how the pipe repair bypass apparatus of this invention provides the advantages set forth in the introductory portion of this specification. Other modifications of its simple and inexpensive construction would also be recognizable to those skilled in this art.

While I have shown and described a certain present preferred embodiment of this invention, it is to be distinctly understood that the invention is not limited thereto, but may be otherwise embodied and formed within the scope of the following claims.

I claim:

1. A pipe repair bypass apparatus, comprising:
   at least one flexible non-metallic disc stop means having outer dimensions slightly larger than the inside dimensions of pipe to be repaired by soldering for insertion into pipe to partially block the flow of liquid through the pipe, said stop means having an opening therethrough;
   elongated flexible tubing having one end section thereof secured to said stop means and extending through said opening with the passageway of said tubing being unobstructed to allow flow of liquid across said stop means; and
   rigid tube member insertion means slidable on and surrounding said tubing at said one end section thereof and abutting said stop means for inserting said stop means and said tubing into the confines of pipe to be repaired.

2. A pipe repair bypass apparatus as set forth in claim 1 wherein said stop means is at least two non-metallic generally parallel discs longitudinally spaced on said one end section of said flexible tubing.

* * * * *